United States Patent
Kuwabara et al.

(10) Patent No.: US 7,557,474 B2
(45) Date of Patent: Jul. 7, 2009

(54) ELECTROMAGNETIC EXCITER

(75) Inventors: Atsushi Kuwabara, Fujiyoshida (JP); Toshio Itakura, Fujiyoshida (JP)

(73) Assignee: Citizen Electronics Co., Ltd., Yamanshi-Ke (JP)

( * ) Notice: Subject to any disclaimer, the term of this patent is extended or adjusted under 35 U.S.C. 154(b) by 339 days.

(21) Appl. No.: 11/655,026

(22) Filed: Jan. 18, 2007

(65) Prior Publication Data
US 2007/0164616 A1  Jul. 19, 2007

(30) Foreign Application Priority Data
Jan. 19, 2006 (JP) ............... 2006-011087

(51) Int. Cl.
H04R 9/02 (2006.01)
H02K 33/00 (2006.01)

(52) U.S. Cl. ............... 310/21; 310/23; 310/29; 310/30; 381/409

(58) Field of Classification Search ............... 310/15, 310/17, 21, 23, 28–30, 36, 38; 381/396, 381/409, 410
See application file for complete search history.

(56) References Cited

U.S. PATENT DOCUMENTS

| | | | | |
|---|---|---|---|---|
| 5,861,686 A * | 1/1999 | Lee | ............... | 310/36 |
| 5,894,263 A * | 4/1999 | Shimakawa et al. | ....... | 340/388.1 |
| 6,208,237 B1 * | 3/2001 | Saiki et al. | ............... | 340/388.1 |
| 6,377,145 B1 * | 4/2002 | Kumagai | ............... | 335/274 |
| 6,590,991 B1 * | 7/2003 | Maeda | ............... | 381/409 |
| 6,850,138 B1 * | 2/2005 | Sakai | ............... | 335/222 |
| 7,271,511 B2 * | 9/2007 | Osaka | ............... | 310/12 |
| 2003/0227225 A1 * | 12/2003 | Kaneda et al. | ............... | 310/81 |
| 2005/0285454 A1 * | 12/2005 | Choi et al. | ............... | 310/14 |
| 2006/0266967 A1 * | 11/2006 | Miura | ............... | 251/129.15 |
| 2007/0236088 A1 * | 10/2007 | Miura | ............... | 310/15 |

FOREIGN PATENT DOCUMENTS

| | | | |
|---|---|---|---|
| JP | 2003009495 A | * | 9/2003 |
| JP | 2003251278 A | * | 9/2003 |
| JP | 2004266424 A | * | 9/2004 |
| JP | 2006-333273A A1 | | 12/2006 |

* cited by examiner

Primary Examiner—Burton Mullins
(74) Attorney, Agent, or Firm—Brinks Hofer Gilson & Lione

(57) ABSTRACT

An electromagnetic exciter includes a first suspension having a cylindrical side wall portion coaxial with respect to a cylindrical wall of a yoke of a magnetic circuit assembly, and a spring portion integrally formed at the lower end of the cylindrical side wall portion to support the lower end of the magnetic circuit assembly so that the magnetic circuit assembly is vibratable. An annular support member is secured to the inner peripheral surface of the upper end opening of the cylindrical side wall portion of the first suspension. A printed wiring board that supports a voice coil is supported on the annular support member. A protector has a cylindrical portion installed to cover the outer peripheral surface of the cylindrical side wall portion of the first suspension, and a caulking portion that is bent radially inward over the upper end edge of the cylindrical side wall portion of the first suspension to clamp the printed wiring board between itself and the annular support member.

5 Claims, 4 Drawing Sheets

ELECTROMAGNETIC EXCITER

This application claims priority under 35 U.S.C. §119 to Japanese Patent Application No. JP2006-011087 filed Jan. 19, 2006, the entire content of which is hereby incorporated by reference.

BACKGROUND OF THE INVENTION

1. Field of the Invention

The present invention relates to electromagnetic exciters that may be incorporated into mobile communications devices such as cellular phones and personal digital assistants (PDAs) to inform the user of an incoming call by vibrating a panel or a housing of a phone, for example.

2. Description of the Background Art

Conventionally, mobile communications devices such as cellular phones and personal digital assistants are arranged to inform the user of an incoming call by selectively generating beep sound or melody sound, or vibrating the housing of the device instead of producing sound. For this purpose, these communications devices incorporate a combination of a speaker for generating sound and a vibration-generating device that generates vibration by rotating an eccentric weight with a small motor. Incorporating both a speaker and a vibration-generating device into such a communications device, however, is disadvantageous from the viewpoint of achieving size and cost reduction of the device. Under these circumstances, use has recently been made of an electromagnetic exciter that can selectively generate sound and vibration.

The present applicant filed an application for a patent on an electromagnetic exciter (Japanese Patent Laid-Open Application Publication No. 2006-333273). The electromagnetic exciter in this previous application has, as shown in FIG. 4, a magnetic circuit assembly 21 including a cup-shaped yoke 22, a combination of a plate-shaped magnet 23 and a top plate 24 that are successively stacked in the yoke 22, a voice coil 25 that is inserted into a magnetic gap g formed between the inner peripheral portion of the yoke 22 and the outer peripheral portion of the top plate 24 and a weight 29 that is secured to the outer peripheral surface of the yoke 22.

The magnetic circuit assembly 21 is, as shown in FIGS. 4 and 5, supported by a cylindrical suspension 26 formed by deep drawing a metal sheet in a press. More specifically, the suspension 26 has a cylindrical side wall portion 26a, a ring portion 26b formed along the bottom edge of the cylindrical side wall portion 26a, a dish-shaped portion 26c located radially inside the ring portion 26b, and a pair of arcuate spring portions 26d connecting the ring portion 26b and the dish-shaped portion 26c. The dish-shaped portion 26c is fixed to the magnetic circuit assembly 21 by laser welding or the like. The suspension 26 suspends the magnetic circuit assembly 21 vibratably in the vertical direction as seen in FIG. 4.

An annular support member 27 is fitted and secured in the upper end opening of the cylindrical side wall portion 26a of the suspension 26. A printed wiring board 28 is fixed to the annular support member 27. The printed wiring board 28 supports the voice coil 25 and is provided with wiring patterns electrically connected to the ends of the voice coil 25 and enabling electrical connection to an external device in which an electromagnetic exciter is placed.

The electromagnetic exciter is installed by fixing the printed wiring board 28 to the housing of an electronic device such as a cellular phone. When the voice coil 25 is excited by a driving signal input thereto, the voice coil 25 and the magnetic circuit assembly 21 vibrate relative to each other by interaction therebetween. When the driving signal is of a relatively high frequency in an audio-frequency region, the voice coil 25 mainly vibrates, causing the housing of the electronic device to vibrate through the printed wiring board 28. When the frequency of the driving signal is low, the magnetic circuit assembly 21 mainly vibrates, causing the housing of the electronic device to vibrate through the suspension 26.

FIGS. 6 and 7 show an improvement on the above-described electromagnetic exciter. The illustrated electromagnetic exciter is substantially the same as the above in regard to the main structure. The improved electromagnetic exciter is additionally provided with a second suspension 31 that supports the upper end portion of the magnetic circuit assembly 21. The second suspension 31 has an outer ring portion 31a, an inner ring portion 31b, and arcuate spring portions 31c, which respectively correspond to the ring portion 26b, the dish-shaped portion 26c and the arcuate spring portions 26d of the above-described suspension 26 (hereinafter referred to as "first suspension 26"). The outer ring portion 31a is secured to the annular support member 27, and the inner ring portion 31b is fixed to the upper end surface of the yoke 2, whereby the magnetic circuit assembly 21 is suspended vibratably in the vertical direction. In this electromagnetic exciter, the bottom (ring portion) 26b and side wall portion 26a of the first suspension 26 are partly covered with a protector 30.

In the electromagnetic exciter having the above-described structure, if an impact is applied thereto, for example, due to a fall, the magnetic circuit assembly may be shifted so much that the top plate collides with the printed wiring board. This may result in separation between the printed wiring board and the frame (i.e. the cylindrical side wall portion of the first suspension)

SUMMARY OF THE INVENTION

An object of the present invention is to provide an electromagnetic exciter that is free from the above-described disadvantage of the conventional art.

The present invention provides an electromagnetic exciter which includes:

a magnetic circuit assembly having a cup-shaped yoke with a cylindrical wall and a bottom wall, and a magnet and a top plate that are successively stacked on the bottom wall of the yoke so that a magnetic gap is formed between the inner peripheral surface of the cylindrical wall of the yoke and the outer peripheral surface of the top plate;

a weight attached to the outer periphery of the cylindrical wall of the yoke;

a voice coil that is inserted into the magnetic gap;

a first suspension having a cylindrical side wall portion extending outside the weight coaxially with respect to the cylindrical wall of the yoke, and a spring portion that is integrally formed with the lower end of the cylindrical side wall portion to support the magnetic circuit assembly from the bottom wall of the yoke so that the magnetic circuit assembly is vibratable in the axial direction of the yoke;

an annular support member that is fitted into an opening at the upper end of the cylindrical side wall portion of the first suspension, and secured to the inner peripheral surface of the cylindrical side wall portion;

a printed wiring board having wiring that is connected with ends of the voice coil and that is electrically connectable to an external electronic device into which the electromagnetic exciter of the present invention is incorporated, the printed wiring board being fitted into the opening at the upper end of the cylindrical side wall portion of the first suspension and supported on the annular support member to support the voice coil; and a protector having a cylindrical portion that is installed to cover the outer peripheral surface of the cylindrical side wall portion of the first suspension, and a caulking portion that is bent radially inward over the upper end edge of the cylindrical side wall portion of the first suspension to clamp the printed wiring board between itself and the annular support member.

In the electromagnetic exciter of the present invention, the printed wiring board is mechanically held between the caulking portion of the first suspension and the annular support member. Therefore, it is possible to prevent the printed wiring board from being detached from the annular support member even if a cellular phone or the like equipped with the electromagnetic exciter is accidentally dropped on the floor and an abnormal impact is applied to the electromagnetic exciter, for example. It should be noted that the terms "bottom wall", "upper end", "lower end", etc., as employed in this application are used on the assumption that the electromagnetic exciter is installed so that the axis of the yoke extends in the vertical direction, and that these terms should not be construed as specifying a particular absolute positional relationship. For example, if the axis of the yoke is placed horizontal, the positional relationship between the "upper end" and the "lower end" changes to that between the left end and the right end.

The above-described electromagnetic exciter may be arranged as follows. The first suspension has a ring portion integrally formed with the lower end edge of the cylindrical side wall portion and a connecting portion connected to the bottom side of the magnetic circuit assembly at a position above and radially inside the ring portion. The spring portion includes a pair of arcuate spring portions extending arcuately in an annular space formed between the ring portion and the connecting portion. Each arcuate spring portion may be connected at one end thereof to the ring portion and at the other end thereof to the connecting portion.

The above-described electromagnetic exciter may further include a second suspension having an outer ring portion connected to the annular support member and an inner ring portion connected to the upper end portion of the yoke of the magnetic circuit assembly at a position below and radially inside the outer ring portion. The second suspension further has a pair of arcuate spring portions extending arcuately in an annular space formed between the outer and inner ring portions. Each arcuate spring portion is connected at one end thereof to the outer ring portion and at the other end thereof to the inner ring portion.

In this case, the annular support member may be insert-molded together with the outer ring of the second suspension.

With the above-described arrangement, by controlling the caulking force applied from the caulking portion of the protector to thereby control the pressing force applied to the annular support member from the caulking portion through the printed wiring board, it is possible to adjust the force with which the outer ring portion of the second suspension is restrained or held by the annular support member, and hence possible to adjust the vibration resonance frequency of the magnetic circuit assembly.

The electromagnetic exciter may further include a buffering member fixed to the lower surface of the printed wiring board that faces the magnetic circuit assembly, so that when the magnetic circuit assembly is shifted in the axial direction so as to collide with the printed wiring board, the magnetic circuit assembly collides with the buffering member, thereby buffering an impact applied to the printed wiring board from the magnetic circuit assembly.

The above and other objects, features and advantages of the present invention will become more apparent from the following description of the preferred embodiments thereof, taken in conjunction with the accompanying drawings.

DETAILED DESCRIPTION OF THE PREFERRED EMBODIMENTS

Figure 1:
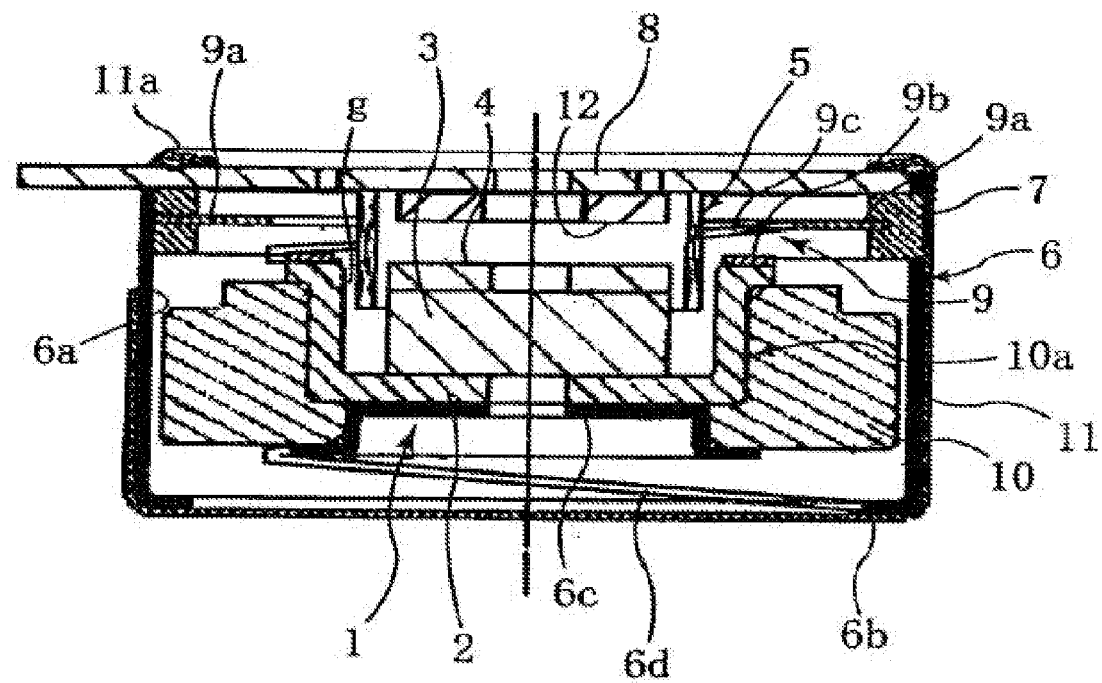
FIG. 1 is a sectional view of an electromagnetic exciter according to an embodiment of the present invention.
Figure 2:
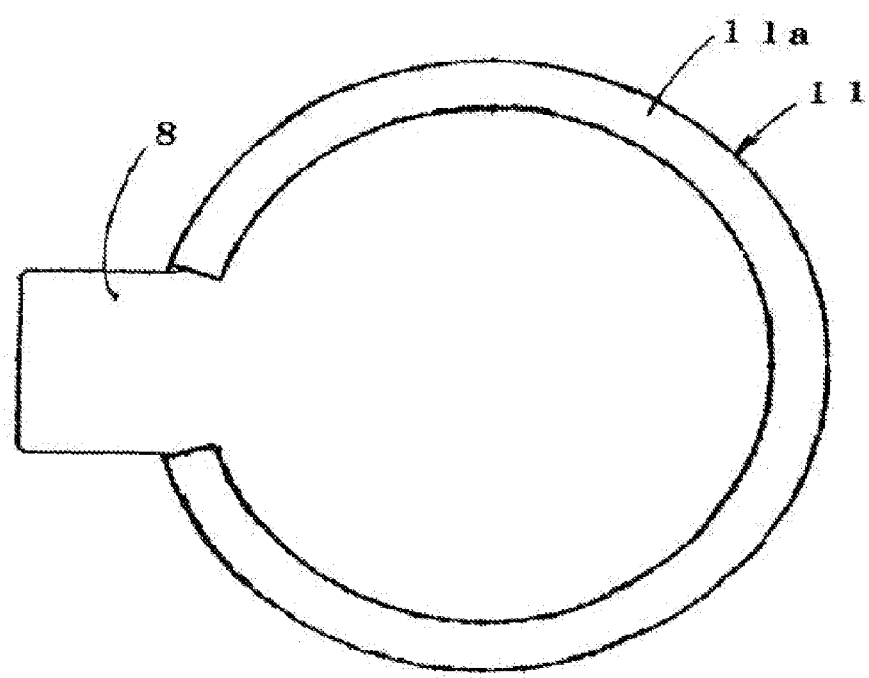
FIG. 2 is a plan view of the electromagnetic exciter shown in FIG. 1.

An embodiment of the electromagnetic exciter according to the present invention will be described below in detail with reference to FIGS. 1 to 3.

The electromagnetic exciter according to the embodiment of the present invention has a magnetic circuit assembly 1 including a substantially cup-shaped yoke 2 and a combination of a flat plate-shaped magnet 3 and a top plate 4 that are successively stacked in the yoke 2, and a voice coil 5 which is inserted in a gap (magnetic gap) g formed between the inner peripheral surface of the yoke 2 and the outer peripheral surface of the top plate 4. The electromagnetic exciter further has a weight 10 secured to the outer peripheral surface of the yoke 2.

Figure 5:
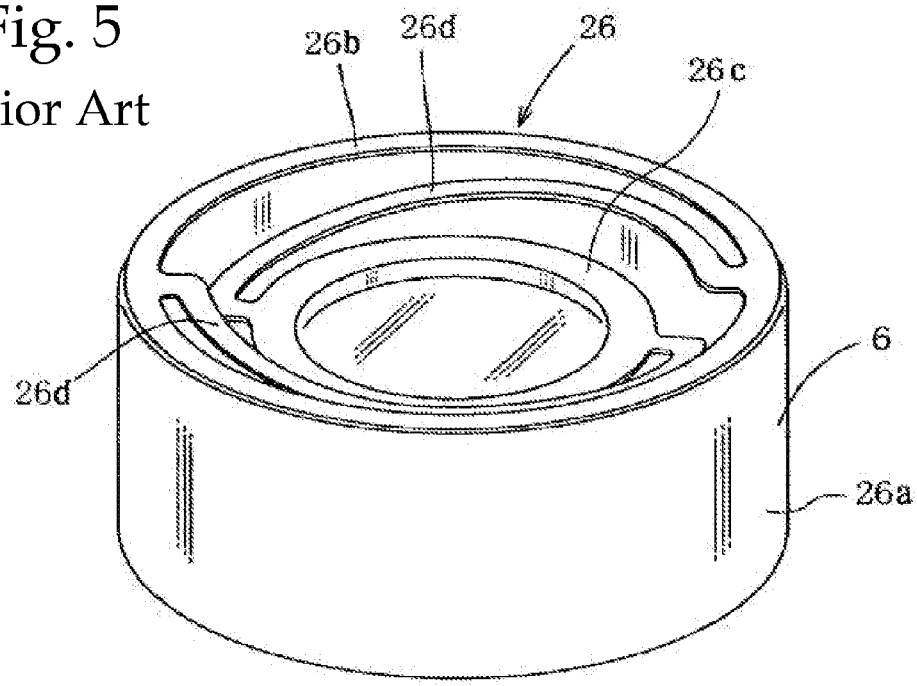
FIG. 5 is a bottom perspective view of a suspension shown in FIG. 4.
Figure 6:
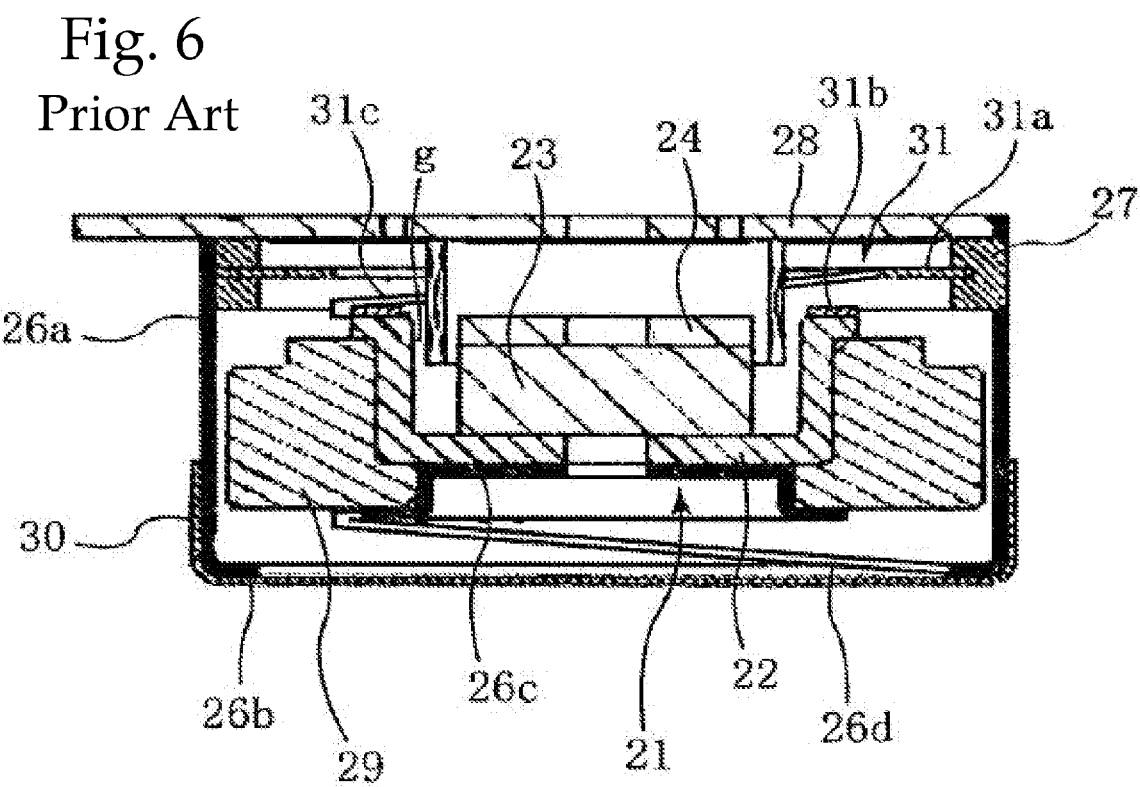
FIG. 6 is a sectional view of another electromagnetic exciter that has been developed previously.
Figure 7:
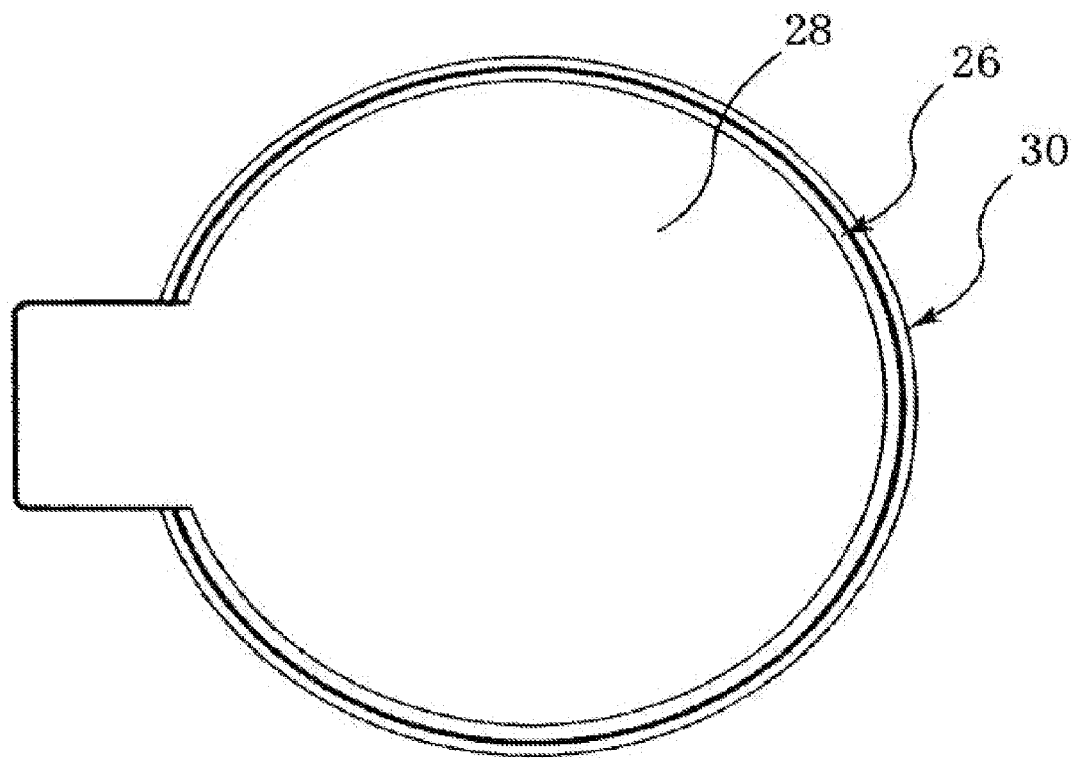
FIG. 7 is a plan view of the electromagnetic exciter shown in FIG. 6.

The magnetic circuit assembly 1 is supported by first and second suspensions 6 and 9 similar to those shown in FIG. 5.

More specifically, the first suspension 6 has a cylindrical side wall portion 6a, a ring portion 6b formed along the bottom edge of the cylindrical side wall portion 6a, a dish-shaped portion 6c located above and radially inside the ring portion 6b, and a pair of arcuate spring portions 6d connecting the ring portion 6b and the dish-shaped portion 6c. The dish-shaped portion 6c is fixed to the bottom of the magnetic circuit assembly 1 by laser welding or the like. The first suspension 6 supports the magnetic circuit assembly 1 vibratably in the vertical direction.

Figure 3:
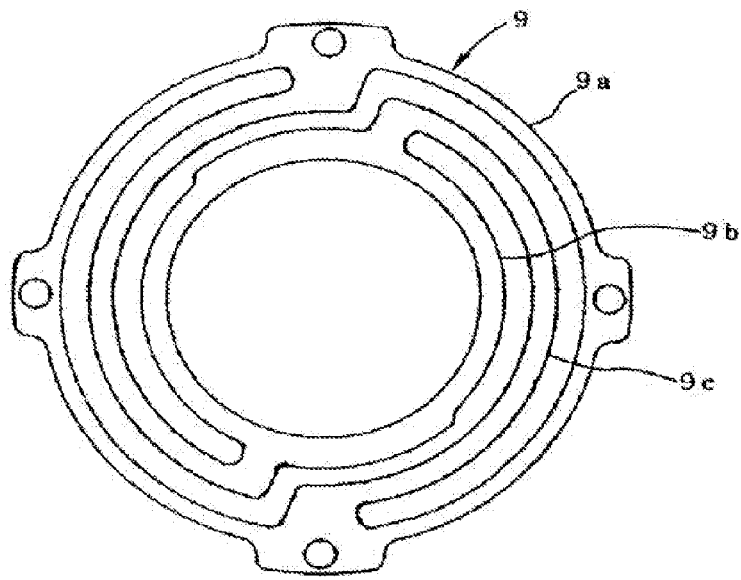
FIG. 3 is a plan view of a second suspension shown in FIG. 1.
Figure 4:
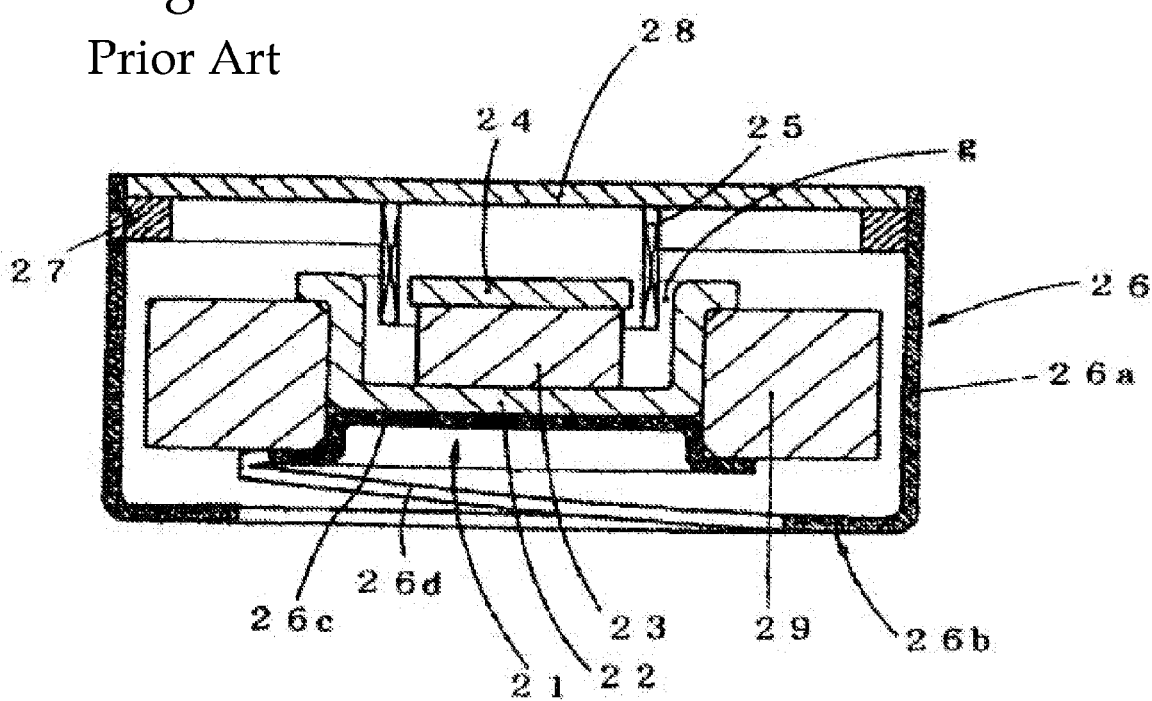
FIG. 4 is a sectional view of an electromagnetic exciter that has been developed previously.

The second suspension 9 has, as shown in FIG. 3, an outer ring portion 9a, an inner ring portion 9b and arcuate spring portions 9c, which respectively correspond to the ring portion 6b, the dish-shaped portion 6c and the arcuate spring portions 6d of the first suspension 6. The outer ring portion 9a is secured to an annular support member 7, and the inner ring portion 9b is fixed to the upper end surface of the yoke 2, whereby the magnetic circuit assembly 1 is suspended vibratably in the vertical direction.

The annular support member 7 is fitted and secured in the upper end opening of the cylindrical side wall portion 6a of the first suspension 6. A printed wiring board 8 is secured to the annular support member 7. The printed wiring board 8 is provided with wiring that is connected with the terminals of the voice coil 5 and that is electrically connectable to an external electronic device into which the electromagnetic exciter of the present invention is incorporated. The annular support member 7 is insert-molded together with the second suspension 9 in such a manner that the outer ring portion 9a is buried in the annular support member 7.

The electromagnetic exciter is provided with a protector 11 that covers the bottom (ring portion) 6b and cylindrical side wall portion 6a of the first suspension 6. The protector 11 extends and bends over the upper end edge of the cylindrical side wall portion 6a of the first suspension 6 to form a caulking portion 11a that clamp the printed wiring board 8 between itself and the annular support member 7.

By controlling the pressing force applied to the printed wiring board 8 from the caulking portion 11a, it is possible to adjust the force with which the outer ring portion 9a of the second suspension 9 is held or restrained by the annular support member 7, and hence possible to adjust the vibration resonance frequency of the magnetic circuit assembly 1.

In the illustrated embodiment, a buffering member 12 is provided on a central portion of the lower surface of the printed wiring board 8 that faces the magnetic circuit assembly 1. The buffering member 12 functions as follows. For example, if a cellular phone or the like equipped with the electromagnetic exciter is accidentally dropped on the floor and an abnormal impact is applied to the electromagnetic exciter, the magnetic circuit assembly 1 may be shifted so much as to collide with the printed wiring board 8. In such a case, the magnetic circuit assembly 1 collides with the buffering member 12, thereby buffering an impact applied to the printed wiring board 8 from the magnetic circuit assembly 1.

It should be noted that the present invention is not necessarily limited to the foregoing embodiment but can be modified in a variety of ways without departing from the gist of the present invention.

What is claimed is:

1. An electromagnetic exciter comprising:
   a magnetic circuit assembly having a cup-shaped yoke with a cylindrical wall and a bottom wall, said magnetic circuit assembly further having a magnet and a top plate that are successively stacked on the bottom wall of said yoke, wherein a magnetic gap is formed between an inner peripheral surface of said cylindrical wall of said yoke and an outer peripheral surface of said top plate;
   a weight attached to an outer periphery of the cylindrical wall of said yoke;
   a voice coil inserted into said magnetic gap;
   a first suspension having a cylindrical side wall portion extending outside said weight coaxially with respect to said cylindrical wall of said yoke, said first suspension further having a spring portion that is integrally formed with a lower end of said cylindrical side wall portion and connected to and support a bottom side of said magnetic circuit assembly so that said magnetic circuit assembly is vibratable in an axial direction of said yoke;
   an annular support member fitted into an opening at an upper end of said cylindrical side wall portion of said first suspension and secured to an inner peripheral surface of said cylindrical side wall portion;
   a printed wiring board having wiring that is connected to ends of said voice coil, said printed wiring board being fitted into said opening at said upper end of said cylindrical side wall portion of said first suspension and supported on said annular support member to support said voice coil and;
   a protector having a cylindrical portion configured to cover an outer peripheral surface of said cylindrical side wall portion of said first suspension, said protector further having a caulking portion that is bent radially inward over an upper end edge of said cylindrical side wall portion of said first suspension to clamp said printed wiring board between said caulking portion and said annular support member.

2. An electromagnetic exciter according to claim 1, wherein said first suspension further comprises:
   a ring portion integrally formed with a lower end edge of said cylindrical side wall portion; and
   a connecting portion connected to said bottom wall of said yoke of said magnetic circuit assembly at a position above and radially inside said ring portion, said spring portion comprising a pair of arcuate spring portions extending arcuately in an annular space formed between said ring portion and said connecting portion, each of said arcuate spring portions being connected at one end thereof to said ring portion and at the other end thereof to said connecting portion.

3. An electromagnetic exciter according to claim 2, further comprising:
   a second suspension having an outer ring portion connected to said annular support member, an inner ring portion connected to an upper end portion of the yoke of said magnetic circuit assembly at a position below and radially inside said outer ring portion, and a pair of arcuate spring portions extending arcuately in an annular space formed between said outer and inner ring portions, each of said arcuate spring portions being connected at one end thereof to said outer ring portion and at the other end thereof to said inner ring portion.

4. An electromagnetic exciter according to claim 3, wherein said annular support member is insert-molded together with said outer ring of said second suspension.

5. An electromagnetic exciter according to claim 1, further comprising:
   a buffering member fixed to a lower surface of said printed wiring board that faces said magnetic circuit assembly, so that when said magnetic circuit assembly is shifted in said axial direction, said magnetic circuit assembly collides with said buffering member, thereby buffering an impact applied to said printed wiring board from said magnetic circuit assembly.

* * * * *